United States Patent
Hughes et al.

(10) Patent No.: US 9,372,103 B2
(45) Date of Patent: Jun. 21, 2016

(54) CALIBRATION OF GRAB DETECTION

(71) Applicant: Facebook, Inc., Menlo Park, CA (US)

(72) Inventors: Charles J. Hughes, Palo Alto, CA (US);
Yael G. Maguire, Boston, MA (US);
Shafigh Shirinfar, Mountain View, CA
(US); Michael John McKenzie Toksvig,
Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 509 days.

(21) Appl. No.: 13/941,289

(22) Filed: Jul. 12, 2013

(65) Prior Publication Data

US 2015/0019153 A1    Jan. 15, 2015

(51) Int. Cl.
| | |
|---|---|
| G06F 3/03 | (2006.01) |
| G06F 17/40 | (2006.01) |
| G06F 19/00 | (2011.01) |
| G01D 21/00 | (2006.01) |
| G06F 1/16 | (2006.01) |
| G06F 3/01 | (2006.01) |
| G06F 3/038 | (2013.01) |
| G06F 3/0354 | (2013.01) |
| H04M 1/725 | (2006.01) |

(52) U.S. Cl.
CPC .............. *G01D 21/00* (2013.01); *G06F 1/169* (2013.01); *G06F 1/1694* (2013.01); *G06F 3/017* (2013.01); *G06F 3/03* (2013.01); *G06F 3/038* (2013.01); *G06F 3/03547* (2013.01); *G06F 17/40* (2013.01); *G06F 19/00* (2013.01); *G06F 2203/0339* (2013.01); *H04M 1/72519* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 8,160,640 B2 * | 4/2012 | Rofougaran | ............ | G01S 7/142 455/550.1 |
| 8,847,880 B2 * | 9/2014 | Lu | ............ | A63F 13/06 345/156 |
| 8,913,056 B2 * | 12/2014 | Zimmer | ............ | G06T 15/20 345/419 |
| 8,942,764 B2 * | 1/2015 | Culbert | ............ | G06F 3/017 345/156 |
| 8,971,565 B2 * | 3/2015 | Anzola | ............ | G06F 3/011 345/156 |
| 2008/0318626 A1 | 12/2008 | Rofougaran | | |
| 2008/0318673 A1 * | 12/2008 | Rofougaran | ............ | G01S 7/412 463/29 |
| 2009/0017910 A1 * | 1/2009 | Rofougaran | ............ | G01S 7/412 463/36 |

(Continued)

FOREIGN PATENT DOCUMENTS

WO    WO 2015/006523 A1 *   1/2015

OTHER PUBLICATIONS

International Search Report and Written Opinion for International Application PCT/US2014/046072, Nov. 24, 2014.

*Primary Examiner* — Edward Cosimano
(74) *Attorney, Agent, or Firm* — Baker Botts L.L.P.

(57) ABSTRACT

In one embodiment, a method includes receiving real-time sensor data from N sensors on the computing device. The real-time sensor data corresponds to a transition in a physical state of the computing device caused by a user of the computing device. The method also includes applying a linear function to the real-time sensor data from each of the N sensors; determining a vector based on an N-tuple comprising the derivatives; comparing the vector with a pre-determined hyperplane with N-1 dimensions; and determining based on the comparison whether the transition is an event corresponding to any of one or more pre-determined imminent uses of the computing device by the user or a non-event not corresponding to any of the pre-determined imminent uses of the computing device by the user.

24 Claims, 10 Drawing Sheets

(56) References Cited

U.S. PATENT DOCUMENTS

| | | |
|---|---|---|
| 2009/0088204 A1 | 4/2009 | Culbert |
| 2009/0296991 A1 | 12/2009 | Anzola |
| 2011/0248915 A1 * | 10/2011 | Lu .......................... A63F 13/06 345/156 |
| 2012/0036433 A1 | 2/2012 | Zimmer |
| 2013/0162525 A1 | 6/2013 | Ye |

* cited by examiner

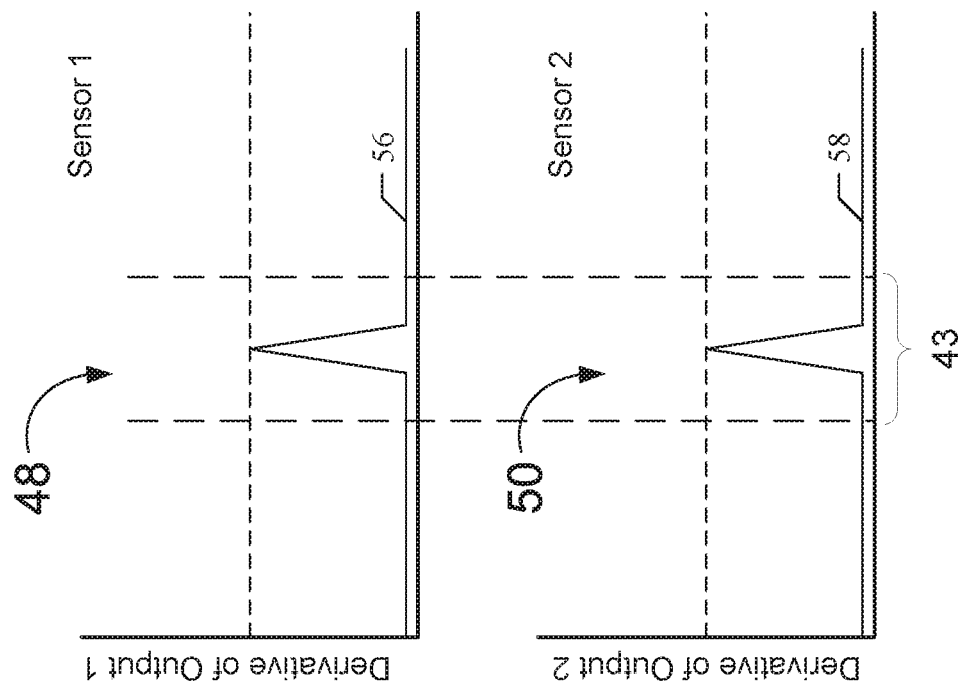
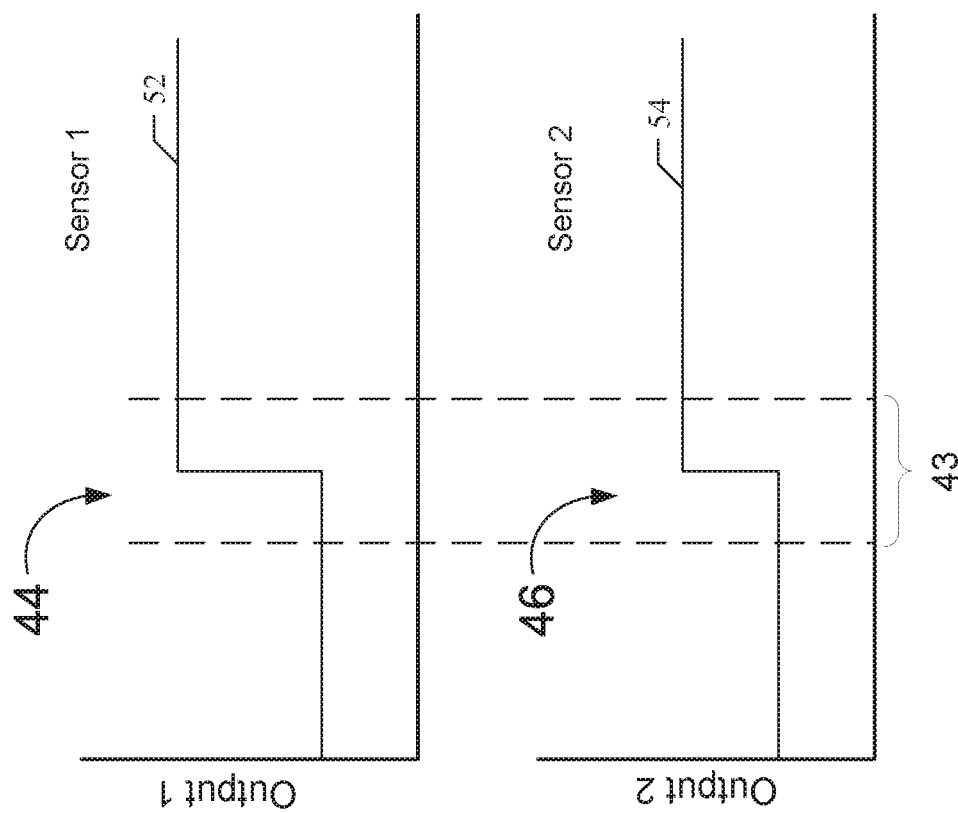
Figure 4B
Figure 4A

CALIBRATION OF GRAB DETECTION

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, with respect to devices having multiple touch sensors disposed at different locations to capture user actions, certain user experience improvements may be enabled by inferring user intent from sensor input generated by transitions between physical states with respect to a human hand or other human body part (e.g., approaching the device, making contact with the device, grasping the device, moving the device, releasing the device, moving away from the device). However, detection of such a transition based on sensor input is dependent upon determining an accurate baseline—with respect to the action of a hand making contact with and grasping a device ("grabbing" the device), the baseline for the raw sensor data may vary depending on differences in the size of the user's hand, the orientation of the user's hand, temperature, humidity, etc. Since the transitions are the meaningful aspect, this issue may be addressed by treating the detection space as the derivative of the raw sensor data. In addition, by collecting a wide range of data points (based on many variations in physical contexts, e.g., walking, running, standing still, standing on a bus, sitting still, sitting on a train, or bicycling, while grabbing the phone from a back pants pocket, from a front jacket pocket, from a bag, or from a holster), the data points can be used to generate a set of training data. For example, a support vector machine (SVM) model can be generated based on the training data and applied in real time to sensor input to classify detected transitions as a "grab" or as "not-a-grab".

Particular embodiments of a mobile device having N touch sensors calculate a derivative of each sensor's output to generate a tuple comprising a vector in N-dimensional space (a support vector). Multiple support vectors (across multiple types of physical contexts, for multiple types of users) may be generated, and each support vector may be classified into one of two sets of support vectors (e.g. "grab" or "not-a-grab"). A separating hyperplane in the N-dimensional space may be calculated based on the two sets of support vectors. The SVM may be applied to map real-time sensor input into the N-dimensional space, calculate the dot product with respect to the hyperplane, and thereby classify the event triggering the sensor input.

Improvements in the accuracy of detection of such transitions between states may be further correlated using input data from other types of sensors, e.g., (1) motion sensors (e.g., accelerometer(s) or gyroscope(s)), (2) proximity sensor(s) (optical or ambient), (3) pressure sensors (e.g., piezoresistive), (4) temperature sensors, etc. Such correlation may be used to help confirm detection of a "grab."

Once the communication device can more accurately detect the "grab," the device may be able to infer that use of the device by the user is imminent, and thus initiate any processes to download and/or upload data in order to bring applications and/or data on the device up to date.

BRIEF DESCRIPTION OF THE DRAWINGS

FIGS. 4A-4B illustrate example detection of a transition in example sensor data.

DESCRIPTION OF EXAMPLE EMBODIMENTS

Figure 1:
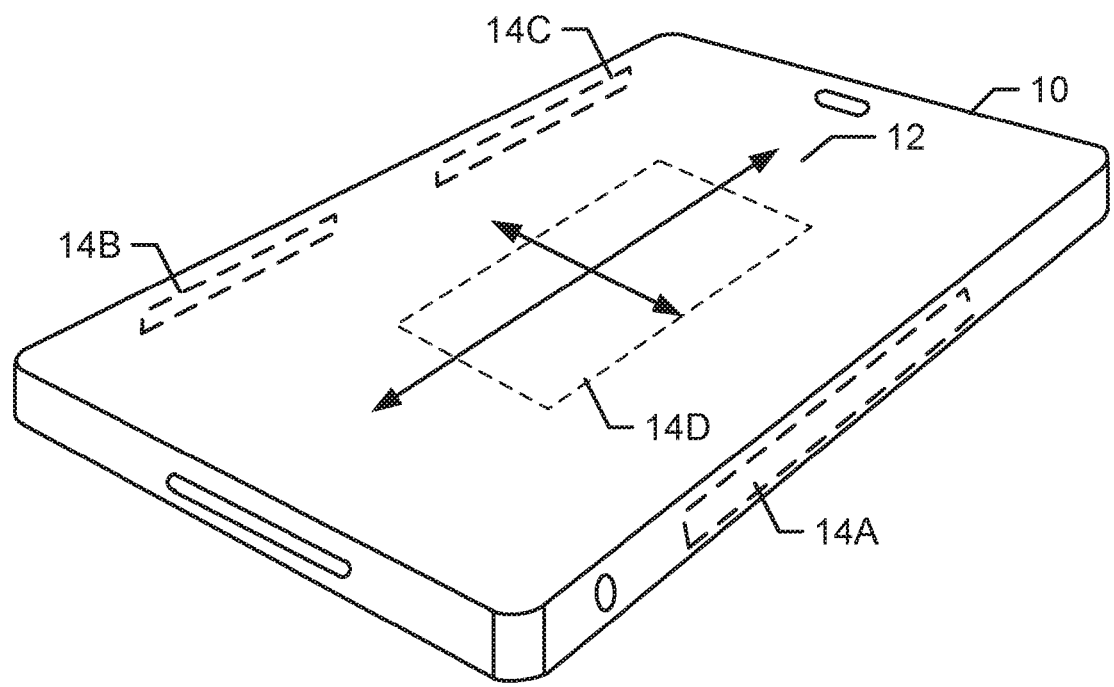
FIG. 1 illustrates an example mobile computing device.

FIG. 1 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a primary touch sensor 12 as an input component. In the case of capacitive touch sensors, there may be three types of electrodes: transmitting, receiving, and loading. These electrodes may be connected to a controller designed to drive the transmitting electrodes with electrical pulses. In the example of FIG. 1, touch sensor 12 is incorporated on a front surface of mobile computing device 10. In the example of FIG. 1, one or more secondary touch sensors 14A-14D may be incorporated into one or more surfaces of mobile computing device 10. In particular embodiments, one or more secondary touch sensors 14A-14D may have coverage over a portion of multiple surfaces of mobile computing device 10, such as for example a portion of a side or bottom surface. As described below, the intent of the user associated with mobile computing device 10 may be inferred through transitions in sensor data detected by one or more touch sensors 12 and 14A-14D or any combination of sensor types.

Mobile computing device 10 many include a communication component for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, mobile computing device 10 may have multiple operational states. As an example and not by way of limitation, when mobile computing device 10 has not being used by its user for a period of time (e.g. a few seconds), mobile computing device 10 may enter into a power-saving state. At the power-saving state, mobile computing device 10 may operate at a lower power level in order to save energy and prolong battery life. The display of mobile computing device 10 may become dim or be powered down. At any given time, mobile computing device 10 may be in any suitable operational state, depending on, for example, whether the user is currently using mobile computing device 10, an amount of time that has elapsed since the most recent use of mobile computing device 10, the physical environment of mobile computing device 10 (e.g. in a carrying case, a pocket, or a drawer).

In particular embodiments, an application executed by an application processor of mobile computing device 10 may prompt the user to perform specific actions within a predetermined period of time to provide sensor data that may function as training data for a machine learning algorithm, such as for example a support vector machine (SVM), neural network, belief propagation, or k-means algorithm. As an example and not by way of limitation, the user may indicate to the application that a particular action is being performed, such as for example riding a bicycle, sitting with mobile computing device 10 in a pocket, or taking mobile computing device 10 from a pocket, and the training application may record sensor data corresponding to the particular action through one or more types of sensors. In particular embodiments, each of the actions may be classified into a particular one of a number of states associated with mobile computing device 10, such as for example, actions associated with making physical contact with mobile computing device 10 or actions not associated with physical contact with mobile computing device 10.

As an example and not by way of limitation, mobile computing device 10 may send the sensor data as an array of measurement values and a state value corresponding to the particular state associated with each action. For example, the training data may be an array of capacitance values from one or more touch sensors of mobile computing device 10. As another example, the training data may include the acceleration measured by the accelerometer while the particular action is being performed. As described above, the training data may also include indicator information associating the particular action with a particular state of mobile computing device 10, such as for example physical contact with mobile computing device 10. As an example and not by way of limitation, a "0" may be assigned to a state representing resting mobile computing device 10 on a surface, such as for example a table. As another example, a "1" may assigned to a state representing physical contact being made with mobile computing device 10, such as for example picking up from the table. Although this disclosure describes collecting training data for a particular number of particular states associated with the mobile computing device, this disclosure contemplates collecting training data for any suitable number of states associated with any suitable computing device.

In particular embodiments, real-time sensor data may be determined to be an event corresponding to one or more pre-determined intended use of mobile computing device 10 based at least in part on the comparing the real-time sensor data to the training data. As described below, the training data may be used to classify sensor data into a number of pre-determined uses of mobile computing device 10 and define a hyperplane separating sensor data into pre-determined uses of mobile computing device 10. Furthermore, parameters defining the hyperplane may be sent to mobile computing device 10 and a processor (e.g. sensor hub) of mobile computing device 10 may determine of the real-time sensor is an event corresponding to one of the pre-determined intended uses of mobile computing device 10 based at least in part on a comparison of the real-time sensor data relative to hyperplane, as described below.

In particular embodiments, real-time sensor data may be determined to corresponding to an imminent use of mobile computing device 10 based at least in part on analyzing a projection of vector mapping of the real-time sensor data. As described below, a projection of a vector corresponding to the real-time sensor data on a vector corresponding to steady-state condition may reduce the linear dependence of the vectors. Furthermore, a processor (e.g. sensor hub), may as calculate the projection through calculating a dot product of the vectors and determine an imminent use of mobile computing device 10 as described below.

Figure 2:
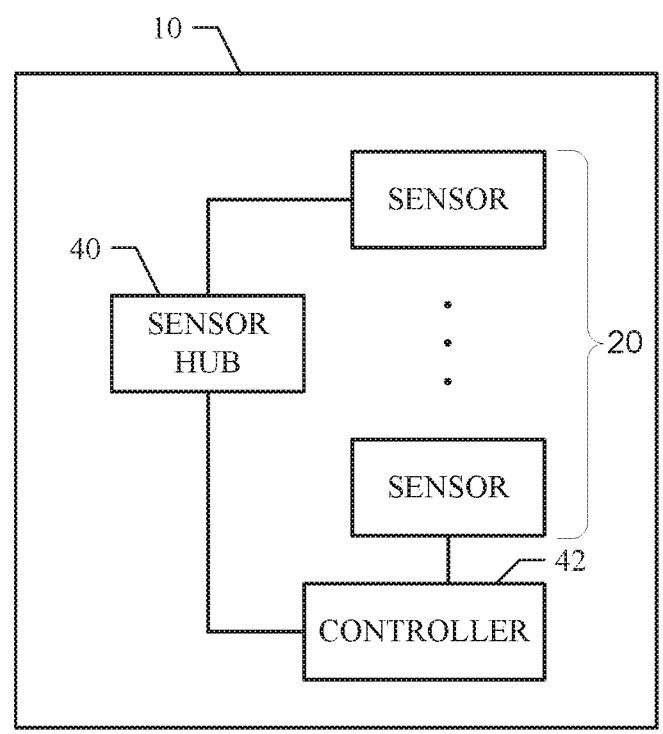
FIG. 2 illustrates an example sensor configuration of an example mobile computing device.

FIG. 2 illustrates an example sensor configuration of an example mobile computing device. In particular embodiments, an sensor array 20 of mobile computing device 10 may include one or more types of sensors. The one or more types of sensors may include a touch sensor, accelerometer, gyroscope, optical proximity sensor, ambient light sensor, image sensor, microphone, or any combination thereof. Different sensor types of sensor array 20 may each measure a different type of data. Although this disclosure describes the collection of environmental data associated with the mobile computing device by particular types of sensors, this disclosure contemplates the collection of sensor data associated with the mobile computing device by any suitable type of sensor. One or more sensors of sensor array 20 may be coupled to a sensor hub 40 of mobile computing device 10. As an example and not by way of limitation, sensor hub 40 may be a low power-consuming processor that controls one or more sensors of sensor array 20, manages power for sensors, processes sensor inputs, aggregates sensor data, and performs certain sensor functions. In particular embodiments, one or more types of sensors of sensor array 20 may be connected to a controller 42. As an example and not by way of limitation, sensor hub 40 may be coupled to controller 42 that is in turn coupled to sensor array 20. In particular embodiments, a sensor monitor may manage sensor array 20. In particular embodiments, sensor hub 40 or application processor of mobile computing device 10 detect a transition in the data measured by one or more types of sensors of sensor array 20 and correlate to the transitions in the data from the different types of sensors determine an imminent intended use of mobile computing device 10, as described below.

In particular embodiments, as described above, sensor array 20 of mobile computing device 10 may include an accelerometer in addition to one or more other types of sensors. The sensor data provided by the accelerometer may be used at least in part to infer whether the user intends to use mobile computing device 10. When the mobile computing device 10 is stored in a user's pocket, mobile computing device 10 may move as the user moves. However, such movements occur over a relatively long period of time. On the other hand, when the user makes physical contact with mobile computing device 10 and takes mobile computing device 10 out of the pocket to bring it in front of the user's face, there may be an increase in the movement speed of mobile computing device 10 within a relatively short period of time. This change in a movement speed of mobile computing device 10 may be detected based on the sensor data supplied by the accelerometer.

In particular embodiments, as described above, sensor array 20 of mobile computing device 10 may include a gyroscope in addition to one or more other types of sensors. A gyroscope is a type of sensor configured to measure the angular velocity along one or more positional axes. Furthermore, a gyroscope may be used to measure the orientation of mobile computing device 10. As an example and not by way of limitation, when mobile computing device 10 is stored in the user's pocket, it may remain substantially in place along a particular orientation. However, when the user makes physical contact with mobile computing device 10 and takes it out of the pocket to bring it in front of the user's face, there may be a change in the orientation of mobile computing device 10 that occurs in a relatively short period of time. The change in orientation of mobile computing device 10 may be detected and measured by the gyroscope. If the orientation of mobile computing device 10 has changed significantly, the change of orientation may be a corroborative indicator along with data from another type of sensor, such as for example touch sensor or accelerometer data, that the user may have made physical contact with mobile computing device 10.

In particular embodiments, sensor array 20 of mobile computing device 10 may include an optical-proximity sensor. The sensor data supplied by the optical proximity sensor may be analyzed to detect when mobile computing device 10 is in close proximity to a specific object, such as the user's hand. In particular embodiments, mobile computing device 10 may have an optical-proximity sensor with an infrared light-emitting diode (IR LED) placed on its back side. As an example and not by way of limitation, when the user holds mobile computing device 10 in his hand, the palm of the user's hand may cover the IR LED. As a result, IR LED may detect when an object is in proximity to mobile computing device 10. In particular embodiments, determination of an object in proximity to mobile computing device 10 may be a corroborative indicator along with data from another type of sensor, such as for example touch sensor or accelerometer data, that the user may have made physical contact with mobile computing device 10.

In particular embodiments, correlating individual types of sensor data may be used to infer an intention of the user with respect to mobile computing device 10 (e.g. whether the user really means grasp mobile computing device 10 and use it). As described below, using multiple types of sensor data in combination may yield a more accurate inference of the user's intention with respect to mobile computing device 10 compared to using data from a single type of sensor in isolation. As an example and not by way of limitation, use of mobile computing device 10 may be inferred based at least in part on detecting a significant increase in the speed of the movement of mobile computing device 10 through an accelerometer in addition to detecting a body part of the user in proximity to mobile computing device 10 through one or more touch sensors. As another example, use of mobile computing device 10 may be inferred based at least in part on detecting a change of orientation of mobile computing device 10 through a gyroscope in addition to detecting a body part of the user in proximity to mobile computing device 10 through an optical proximity sensor. In particular embodiments, a pre-determined function of mobile computing device 10 may be in initiated based at least in part on the inferred intent of the user with respect to mobile computing device 10 as described below. As an example and not by way of limitation, mobile computing device 10 may be brought out of the power-saving state into a normal operational state (e.g. turn on the display of the mobile device) and input component of mobile computing device 10 may be unlocked automatically based at least in part on inferring the user may be about to use mobile computing device 10.

Figure 3:
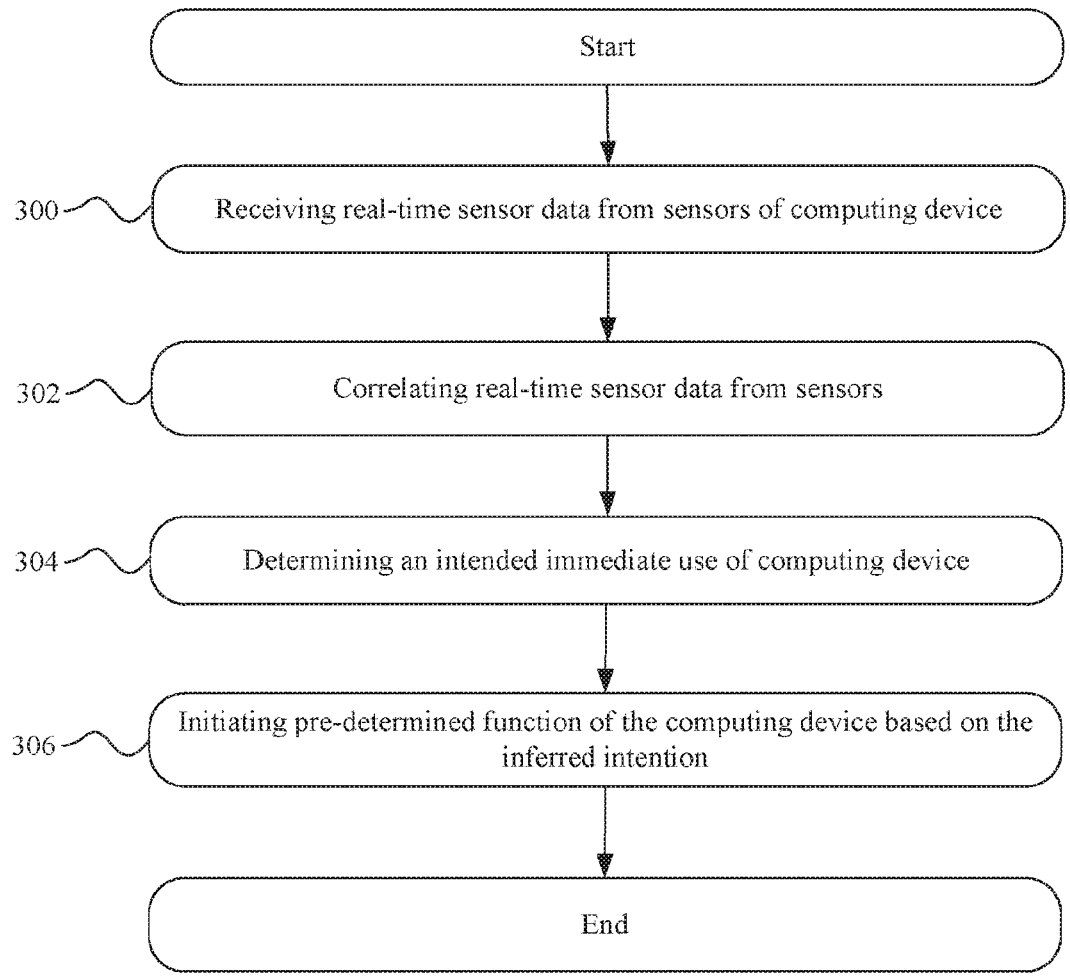
FIG. 3 illustrates an example method for initiating a pre-determined function of a computing device based on an inferred intent of a user.

FIG. 3 illustrates an example method for initiating a pre-determined function of a computing device based on an imminent intended use. The method may start at step 300, where a computing device receives real-time sensor data from a number of sensor types of computing devices. As described below, the computing device may calculate a derivative of the sensor data to determine a transition in the sensor data. As an example and not by way of limitation, a processor of a mobile computing device may receive the sensor data and perform an operation, such as for example calculating a derivative of the sensor data as a function of time. In particular embodiments, the sensors of one of the computing devices includes different sensor types, such as for example a touch sensor, accelerometer, gyroscope, optical proximity sensor, or any combination thereof.

Step 302, by the computing device, correlates the real-time sensor data from the sensors of different sensor types. In particular embodiments, a processor may apply a convolution operation to the sensor data to determine whether the data chronologically overlaps. An example convolution operation may be illustrated by the following equation:

$$M = \sum_i \int_0^\infty |f'(\tau)| * |g_i'(t-\tau)| d\tau \quad (1)$$

M is the result of the convolution of data from multiple types of sensors, and f' and g' are the derivative of the data from a sensor, such as for example f' may be the derivative of the data measured by an accelerometer, g' may be the derivative of the data measured by a touch sensor. In particular embodiments, the result of the convolution operation may determine whether a transition in the sensor data from different types of sensors chronologically overlap. In another embodiment, an a priori function, such as for example Heaviside or sigmoid functions, may replace the derivative operator. As an example and not by way of limitation, a processor may convolve the data measured a first type of sensor, such as for example touch sensor with data measured by a second type of sensor, such as for example an accelerometer. As another example, an application processor or sensor hub of a mobile computing device may convolve the data measured a first type of sensor, such as for example a touch sensor, with data measured by a second type of sensor, such as for example an optical-proximity sensor. Step 304, by the computing device, may determine an intended imminent use of the computing device based on the correlation. In particular embodiments, based at least in part on a transition in the data of multiple sensor types chronologically overlapping. As an example and not by way of limitation, the computing device may determine the imminent intended use of the computing device based at least in part on a transition in the real-time sensor data from a touch sensor and accelerometer occurring at substantially the same time.

At step 306, the computing device may automatically initiate a pre-determined function of the computing device based at least in part on the determination of the intended imminent use of the computing device, at which point the method may end. As an example and not by way of limitation, the pre-determined function may be initiated in response to the result of a convolution operation M illustrated by equation (1) being higher than a pre-determined threshold value. In particular embodiments, the pre-determined function may power down the computing device associated with the sensors in response to the result of the convolution operation being higher than a pre-determined threshold value. Although this disclosure describes and illustrates particular steps of the method of FIG. 3 as occurring in a particular order, this disclosure contemplates any suitable steps of the method of FIG. 3 occurring in any suitable order. Particular embodiments may repeat one or more steps of the method of FIG. 3, where appropriate. Moreover, although this disclosure describes and illustrates particular components carrying out particular steps of the method of FIG. 3, this disclosure contemplates any suitable combination of any suitable components, such as for example a processor of a mobile computing device, carrying out any suitable steps of the method of FIG. 3.

FIGS. 4A-4B illustrate example detection of a transition in example sensor data. Although this disclosure describes pre-processing the sensor data through a particular linear function, such as for example a derivative function, this disclosure contemplates pre-processing the sensor data through any suitable linear function here, such as for example a convolution with a Heaviside or sigmoid function. In particular embodiments, sensor data 52 and 54 from one or more sensors may be measured as a function of time, as illustrated by 44 and 46 in the example of FIG. 4A, and sensor data 52 and 54 may be analyzed to infer an intention of the user with respect to the computing device associated with the sensors. In particular embodiments, inference of the intention of the user with respect to a particular computing device may be performed sensor data 52 and 54 from multiple sensor types. As an example and not by way of limitation, sensor data 52 may be data measured by a touch sensor of a mobile computing device and sensor data 54 may be data measured by an accelerometer. Furthermore, this disclosure contemplates any suitable form of sensor data 52 and 54 such as for example current, voltage, charge, or any combination thereof.

In particular embodiments, an intended use of the computing device may be determined through a transition in the data from one state to another measured by sensors associated with the computing device, as described above. As an example and not by way of limitation, a transition in sensor data may indicate a mobile computing device is being picked up and about to be used, as described above. In particular embodiments, a transition in sensor data 52 and 54 may be detected based at least in part on calculating a derivative 56 and 58 of sensor data 52 and 54, respectively, as illustrated in the example of FIG. 4B by 48 and 50. As an example and not by way of limitation, a change in the derivative 56 and 58 of the sensor data 52 and 54, respectively, may be detectable during time period 43 in cases where the change in the sensor data 52 and 54 may be relatively small. As another example, the derivative 56 and 58 of the sensor data may be provided to a processor to determine an intended immediate use of computing device, as described above.

Figure 5:
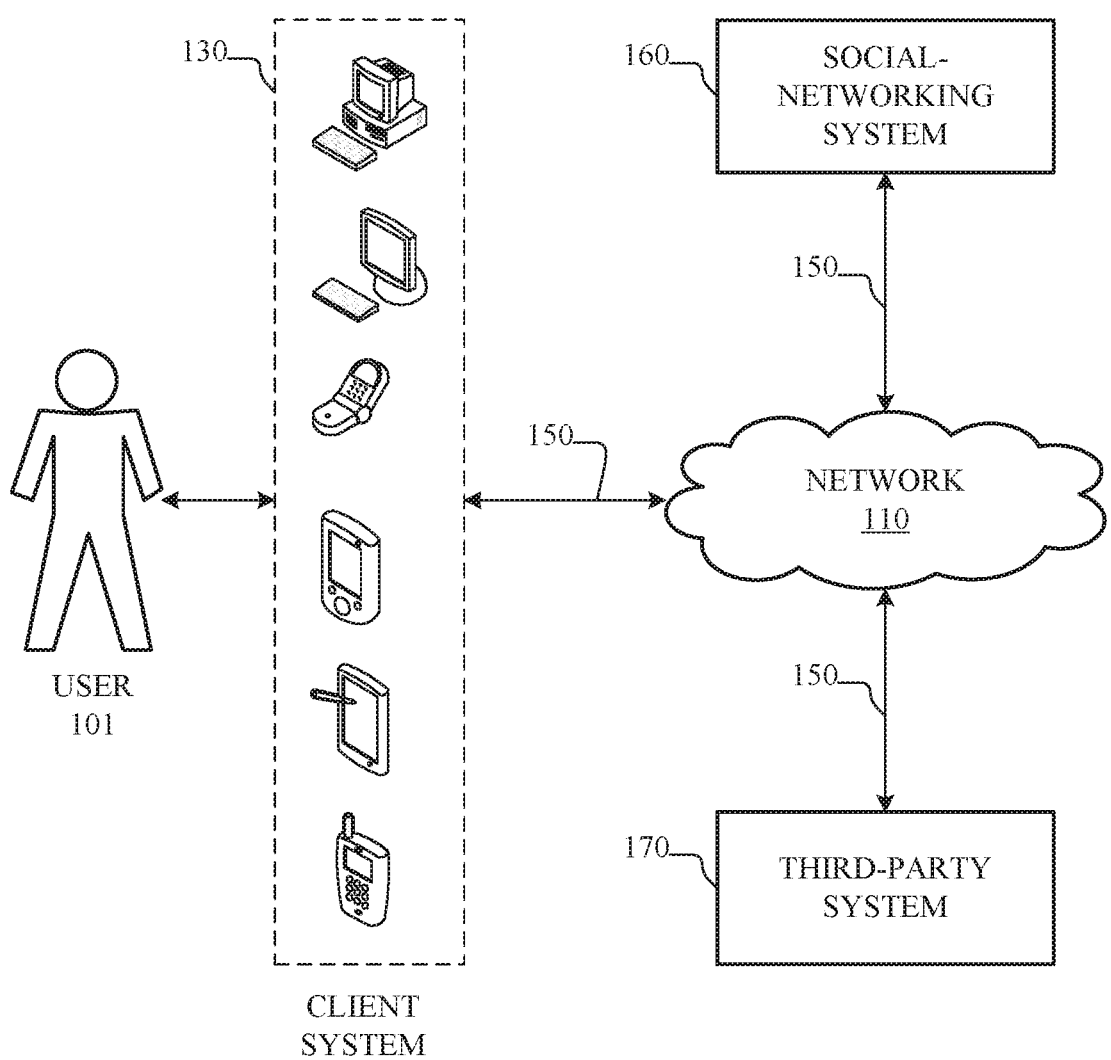
FIG. 5 illustrates an example network environment associated with a social-networking system.

FIG. 5 illustrates an example network environment 100 associated with a social-networking system. Network environment 100 includes a user 101, a client system 130, a social-networking system 160, and a third-party system 170 connected to each other by a network 110. Although FIG. 5 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 5 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, social-networking system 160 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 160 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store.

In particular embodiments, as described above, the sensor data received from client system 130 may function as training data for a machine learning algorithm, such as for example SVM, k-means, Bayesian inference, or a neural network, executed on social-networking system 160. As an example and not by way of limitation, one or more servers of social-networking system 160 may receive training data from one or more of client systems 130 (e.g. a mobile computing device), and use a machine-learning algorithm to correlate sensor data values from particular activities using client system 130 with one or more particular states of client system 130. As an example and not by way of limitation, one or more servers executing the machine-learning algorithm may receive sensor values from sensors of client system 130, such as for example an accelerometer, gyroscope, ambient light sensor, optical proximity sensor, or another sensor of one or more client systems 130. In particular embodiments, data defining a hyperplane determined from the training data may be sent to client system 130 for determining an imminent intended use of client system 130. In particular embodiments, subsequent sensor data may be sent by mobile computing device 10 to re-define the hyperplane. Furthermore, updated data re-defining the hyperplane may be received by mobile computing device 10.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 6:
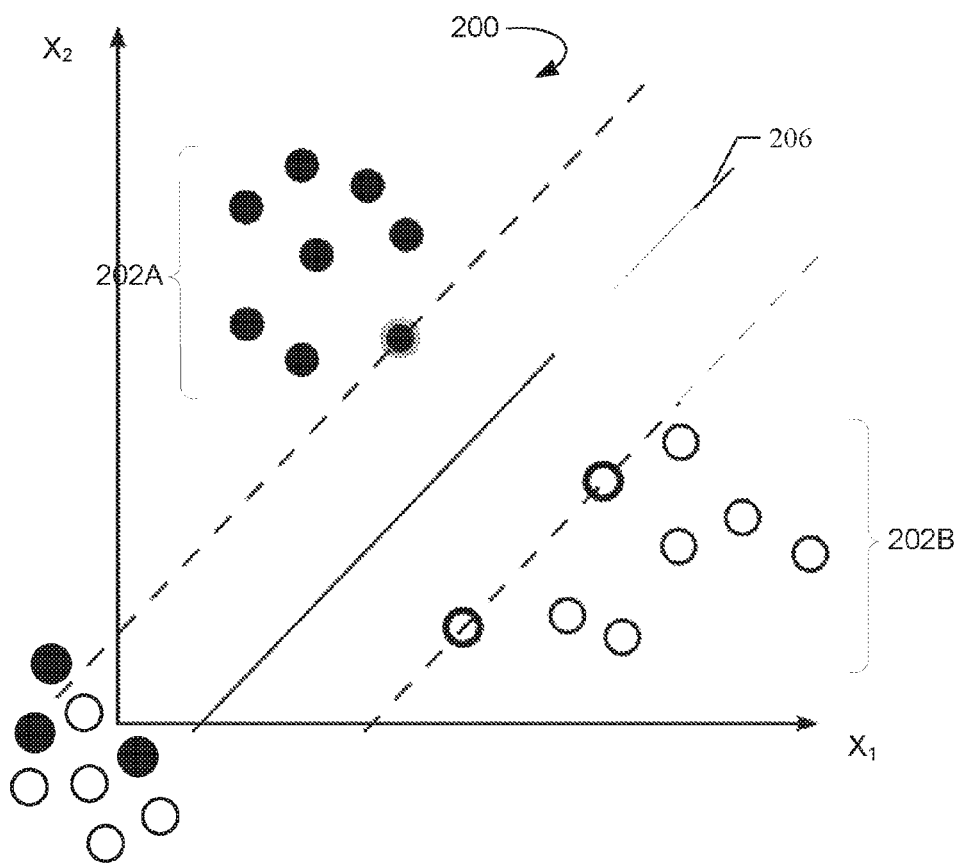
FIG. 6 illustrates an example classification of sensor data.

FIG. 6 illustrates an example classification of sensor data using an example machine learning algorithm. As described above, training data from one or more sensors of a client system, e.g. a mobile computing device, may include sensor data from each sensor captured during the performance of a particular activity and indicator information corresponding to a particular state of the client system associated with the particular activity. As an example and not by way of limitation, the sensor data may be raw measurement data from the sensors or sensor data that has been pre-processed, such as for example, to calculate the derivative of the raw sensor data, as described above. Furthermore, the sensor data may correspond to a transition in a physical state (e.g. movement) of the client system. In particular embodiments, sensor data may be further processed, such as for example through a filtering or convolution operation. As an example and not by way of limitation, the training data from each particular activity may be classified into one of two particular states associated with the client device based at least in part on the indicator information associated with each set of sensor data, as described above. For example, one or more sets of sensor data may correspond to activity associated with physical contact with a mobile computing device, e.g. holding the mobile computing device, and one or more sets of sensor data may correspond to activity not associated with physical contact with the mobile computing device, e.g. resting the mobile computing device on a table.

As illustrated in the example of FIG. 6, the training data for each particular action may be represented as a vector 202A-202B in a N-dimensional space 200, where N may be equal to the number of sensors of the client system. As an example and not by way of limitation, each vector 202A-202B may be mapped to N-dimensional space 200 through a kernel function. Furthermore, each vector 202A-202B may be based at least in part on the N-tuple of the derivative of the sensor data. As illustrated in the example of FIG. 6, vectors 202A-202B may be classified with one of two particular states associated with the client system that are separated by a hyperplane 206 or a non-linear surface in N-dimensional space 200. In particular embodiments, hyperplane 206 may have N−1 dimensions and be defined by a set of points with a constant dot product with one or more support vectors of each state. As an example and not by way of limitation, the support vectors may be defined as the vector for each particular state that has a maximum derivative and the distance between hyperplane 206 and each support vector may be maximized. In particular embodiments, data defining hyperplane 206 may be sent to the client system. In particular embodiments, hyperplane 206 may be modified based on subsequent vectors determined from subsequent sensor data received from the client system. Furthermore, the updated data re-defining hyperplane 206 may be sent to the client system.

In particular embodiments, an imminent use of the client system may be determined by the client system based at least in part on the classification of a vector corresponding to subsequent sensor data from client system with a particular state of the client system. In particular embodiments, classification of the vector corresponding to subsequent sensor data may be based at least in part on the position of the vector relative to hyperplane 206. As an example and not by way of limitation, it may be inferred that the user of the client system intends to use the client system based at least in part on the vector corresponding to subsequent sensor data being classified with a state corresponding to physical contact with the client system, such as for example, defined by vectors 202A. Furthermore, the imminent use of the client system may be determined to correspond to physical contact with the client system when the vector is on a same side of hyperplane 206 as vectors 202A. Otherwise, if the subsequent vector is located on a same side of hyperplane 206 as vectors 202B, it may be determined the client system is substantially stationary. In particular embodiments, a processor of the client system may initiate a pre-determined function of the client system based at least in part on classifying subsequent vectors with a particular state of a client system.

Figure 7:
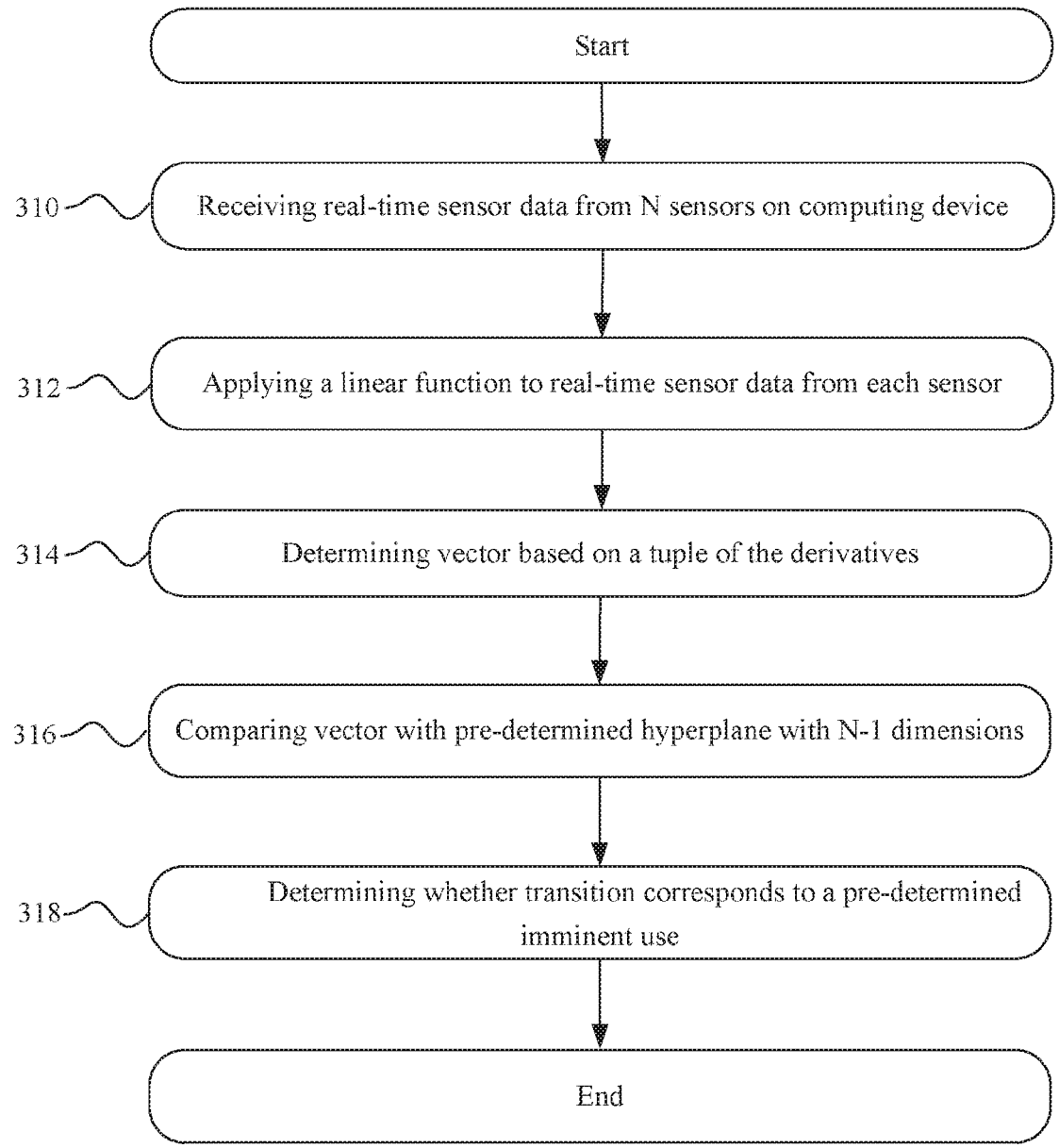
FIG. 7 illustrates an example method for determining whether sensor data corresponds to a pre-determined use of a client system.

FIG. 7 illustrates an example method of determining whether sensor data corresponds to a pre-determined use of a client system. The method may start at step 310, where a computing device receives real-time sensor data from sensors on the computing device. In particular embodiments, the real-time sensor data may correspond to a transition in a physical state of the computing device caused by a user of the computing device. Step 312, by the computing device, applies a linear function to the real-time sensor data from each sensor. As an example and not by way of limitation, the linear function may comprise a filtering function, derivative function, convolution of a Heaviside or sigmoid function, or any combination thereof. Furthermore, a processor of a mobile computing device may receive the sensor data and perform an operation, such as for example calculating a derivative of the sensor data as a function of time. Step 314, by the computing device, determines a vector based on a tuple of the derivatives. In particular embodiments, the tuple may have dimension equal to the number of sensors. At step 316 the computing device may compare the vector with a pre-determined hyperplane. As described above, the hyperplane may have dimensions one fewer than the number of sensors of the computing device.

At step 318, the computing device may determine based on the comparison whether the transition is an event that corresponds to any pre-determined imminent use of the computing device, at which point the method may end. In particular embodiments, the determination may be made through determining the position of the vector relative to the pre-determined hyperplane. Although this disclosure describes and illustrates particular steps of the method of FIG. 7 as occurring in a particular order, this disclosure contemplates any suitable steps of the method of FIG. 7 occurring in any suitable order. Particular embodiments may repeat one or more steps of the method of FIG. 7, where appropriate. Moreover, although this disclosure describes and illustrates particular components carrying out particular steps of the method of FIG. 7, this disclosure contemplates any suitable combination of any suitable components, such as for example a processor of a mobile computing device, carrying out any suitable steps of the method of FIG. 7.

Figure 8:
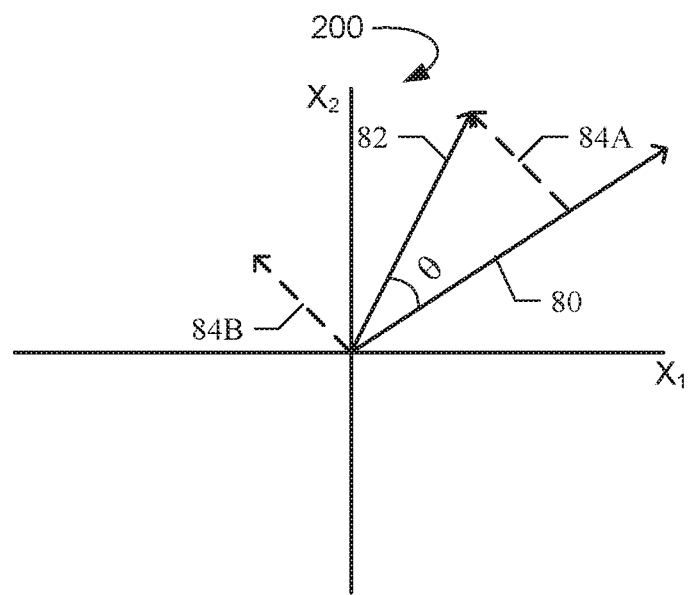
FIG. 8 illustrates an example isolation of components of sensor data through calculation of an example projection.

FIG. 8 illustrates an example isolation of components of sensor data through calculation of an example projection. In particular embodiments, mapping sensor data to N-dimensional space 200 may be used to isolate particular components of the sensor data. As an example and not by way of limitation, the linear dependence of one sensor to another sensor with a degree of spatial overlap may be reduced through determination of a projection 84A of the data of one sensor to another, as described below. In particular embodiments, a mobile computing device may include multiple touch sensors in multiple locations of the mobile computing device, as illustrated in the example of FIG. 1. As an example and not by way of limitation, the mobile computing device may include a first touch sensor having a touch-sensitive area with coverage along a side of the mobile computing device and a second touch sensor having a touch-sensitive area that may include at least a portion of two or more surfaces (e.g. a side and bottom). As another example, the linear dependence of sensor data with a degree of temporal separation may be reduced through determination of a projection of the sensor data. For example, a portion of current sensor data may be isolated based at least in part on determining a projection of a vector corresponding to current sensor data on a vector corresponding to a prior steady state condition.

Furthermore, an imminent use of the client system may be determined by analyzing a projection 84A or 84B. As an example and not by way of limitation, the sensor data from a client system may be temporally separated data from one or more spatially overlapping sensors and correspond to a transition from a steady-state condition of the client system. In particular embodiments, the projection may be calculated using raw measurement data or sensor data that has been pre-processed, such as for example by calculating the derivative of the raw sensor data, as described above. Furthermore, sensor data may be further processed, such as for example, through a filtering or convolution operation. In particular embodiments, the sensor data captured at particular times may each be represented as a vector 80 and 82 in a N-dimensional space 200, where N may be equal to the number of sensors of the client system. As an example and not by way of limitation, each vector 80 and 82 may be mapped to N-dimensional space 200 through a kernel function. Furthermore, each vector 80 and 82 may based at least in part on the N-tuple of the derivative of the sensor data.

In particular embodiments, the projection 84A of vector 80 corresponding to the steady-state condition on vector 82 corresponding to real-time sensor data may be determined based at least in part on a dot product of the vectors 80 and 82. As illustrated in the example of FIGS. 4A-4B, vectors 80 and 82 may be a derivative of the sensor data of a client system. In particular embodiments, one or more components of vector 82 that differs from vector 80 from temporally separated measurements may be isolated by projection 84A of vector 82 on vector 80. An example calculation of projection 84A of vector 82 on vector 80 may be illustrated by the following equation:

$$84A = 82 - 82\cos\Theta \times \frac{80}{|80|} \qquad (2)$$

and an example calculation of projection 84B of vector 82 on vector 80 translated to origin may be illustrated by the following equation:

$$84B = 84A - 82\cos\Theta \times \frac{80}{|80|} \qquad (3)$$

80 is the vector associated with the steady-state condition, |80| is the magnitude of vector 80, and $\Theta$ is the angle formed by vectors 80 and 82.

As an example and not by way of limitation, steady-state condition (i.e. vector 80 of space 200) may correspond to a mobile computing device may be at rest on a surface (e.g. a table) and real-time data (i.e. vector 82) may correspond to physical contact associated with picking up mobile computing device. Furthermore, projection 84A on vector 80 may be calculated through the dot product, as illustrated by equation (2). In particular embodiments, as illustrated by 84B of the example of FIG. 8, projection 84A may be translated to an origin of N-dimensional space 200, for inferring an intent of the user with respect to the client system, as described below.

Furthermore, an intent of the user with respect to a client system may be inferred based at least in part on analysis of projection 84B. In particular embodiments, projection 84B may be classified with a pre-defined imminent use of the client system as described above. In particular embodiments, projection 84B may be compared with a pre-defined projection that corresponds to an imminent use of the client system. As an example and not by way of limitation, it may be determined that the user of a particular client system intends to use the client system based at least in part on a projection 84B being classified with a state corresponding to physical contact with the client system. As described above, a processor of the client system may initiate a pre-determined function of the client system based at least in part on inferring an intent of the user based at least in part on analysis of projection 84B.

Figure 9:
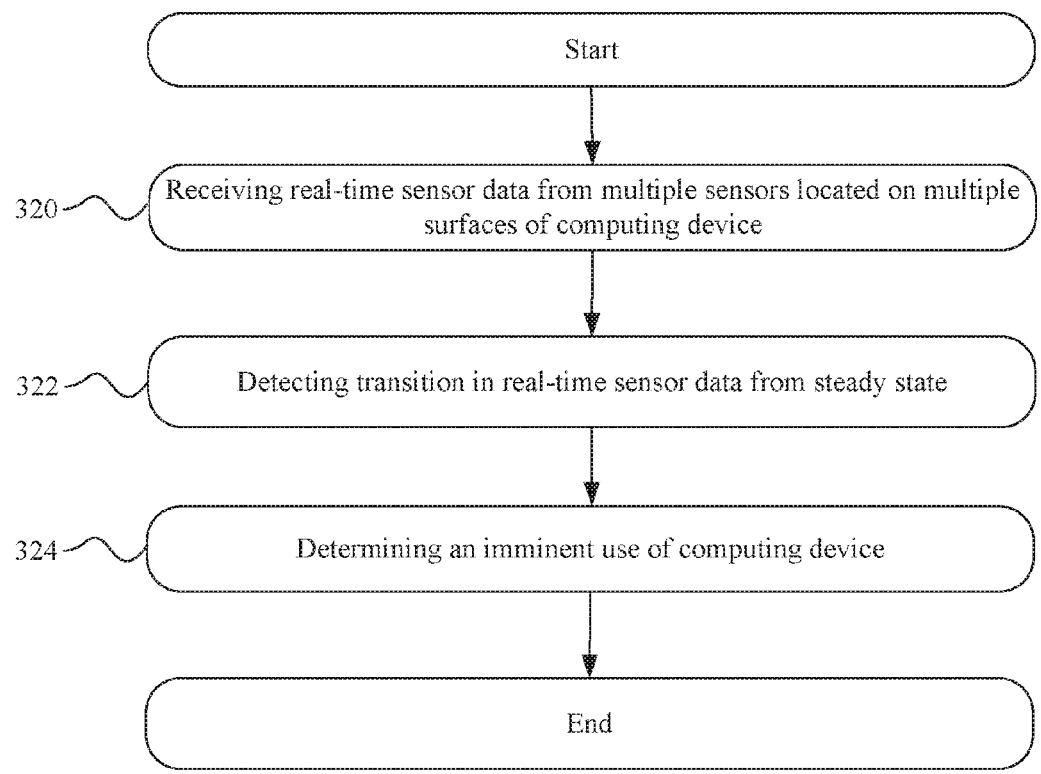
FIG. 9 illustrates example method of isolating a component of sensor data.

FIG. 9 illustrates an example method of isolating a component of sensor data. The method may start at step 320, where a computing device receives real-time sensor data from sensors on the computing device. In particular embodiments, the sensors may be located on multiple surfaces of the computing device. Step 322, by the computing device, detects a transition in the real-time sensor data from a steady state. As an example and not by way of limitation, a processor of a mobile computing device may receive the sensor data and perform an operation, such as for example calculating a derivative of the sensor data as a function of time. At step 324, the computing device may determine based on the detection an imminent use of the computing device, at which point the method may end. In particular embodiments, the computing device, may include determining a vector based on a tuple of the derivatives and calculating a projection of the vector of the real-time sensor data on a vector of the steady-state of the computing device. In particular embodiments, the determination may be made through comparing the projection with a pre-determined projection corresponding to one or more imminent uses. Although this disclosure describes and illustrates particular steps of the method of FIG. 9 as occurring in a particular order, this disclosure contemplates any suitable steps of the method of FIG. 9 occurring in any suitable order. Particular embodiments may repeat one or more steps of the method of FIG. 9, where appropriate. Moreover, although this disclosure describes and illustrates particular components carrying out particular steps of the method of FIG. 9, this disclosure contemplates any suitable combination of any suitable components, such as for example a processor of a mobile computing device, carrying out any suitable steps of the method of FIG. 9.

Figure 10:
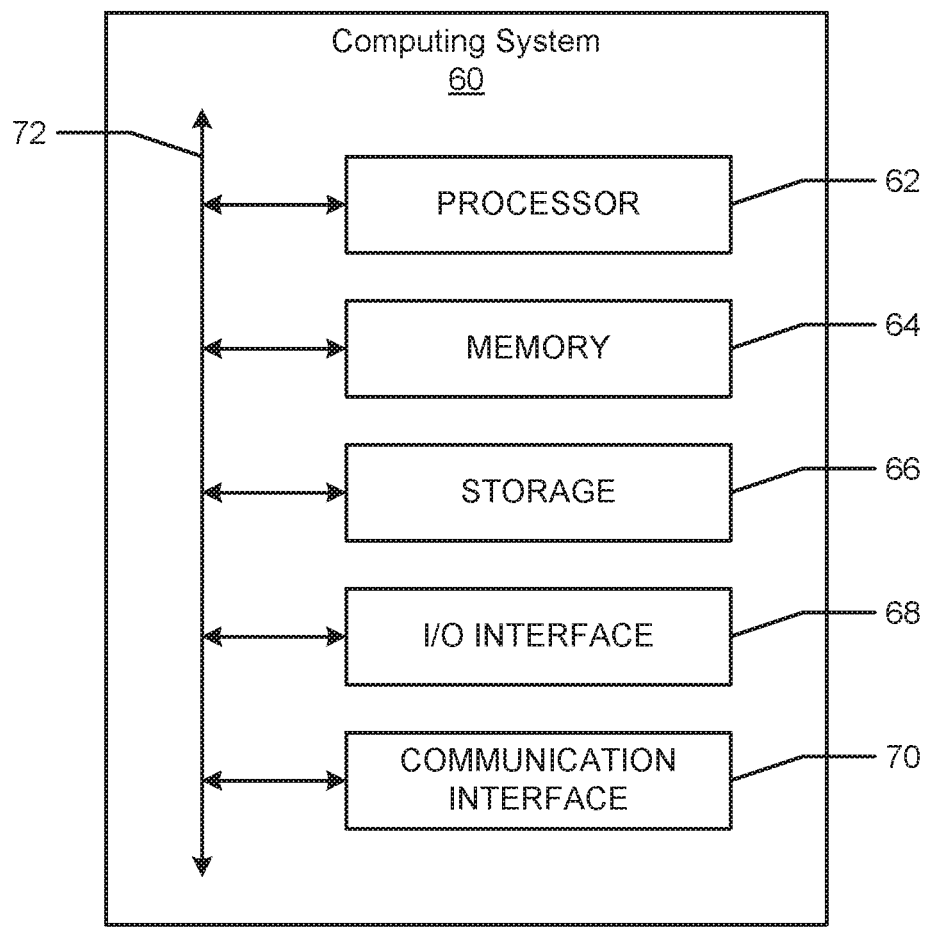
FIG. 10 illustrates an example computing system.

FIG. 10 illustrates an example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile computing system 10, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving real-time sensor data from N sensors on the computing device, the real-time sensor data corresponding to a transition in a physical state of the computing device caused by a user of the computing device;
   by the computing device, applying a linear function to the real-time sensor data from each of the N sensors;
   by the computing device, determining a vector based on an N-tuple comprising the derivatives;
   by the computing device, comparing the vector with a pre-determined hyperplane with N−1 dimensions; and
   by the computing device, determining based on the comparison whether the transition is:
      an event corresponding to any of one or more pre-determined imminent uses of the computing device by the user; or
      a non-event not corresponding to any of the pre-determined imminent uses of the computing device by the user.

2. The method of claim 1, further comprising, by the computing device, receiving data defining the pre-determined hyperplane from a computing device of a social-networking system.

3. The method of claim 1, further comprising:
   by the computing device, sending the real-time sensor data to a computing device of a social-networking system; and
   by the computing device, receiving updated data re-defining the pre-determined hyperplane based at least in part on the real-time sensor data from the computing device of the social-networking system.

4. The method of claim 1, wherein the linear function comprises a filtering function, derivative function, convolution of a Heaviside or sigmoid function, or any combination thereof.

5. The method of claim 1, wherein:
   the computing device is a mobile computing device;
   the imminent intended use corresponds to physical contact between the user and the mobile computing device; and
   the pre-determined function comprises powering on the mobile computing device.

6. The method of claim 1, wherein one or more of the sensors comprises a touch sensor, gyroscope, accelerometer, optical proximity sensor, ambient light sensor, or any combination thereof.

7. The method of claim 1, wherein the comparison comprises:
   by the computing device, calculating a dot product of the vector and the pre-determined hyperplane; and
   by the computing device, determining a position of the vector relative to the pre-determined hyperplane based at least in part on the calculation of the dot product.

8. The method of claim 7, wherein determining whether the transition is an event comprises, by the computing device, determining the position of the vector is on same side of the pre-determined hyperplane as training data associated with the pre-determined imminent use.

9. One or more computer-readable non-transitory storage media embodying software configured when executed to:
   receive real-time sensor data from N sensors on a computing device, the real-time sensor data corresponding to a transition in a physical state of the computing device caused by a user of the computing device;
   apply a linear function to the real-time sensor data from each of the N sensors;

determine a vector based on an N-tuple comprising the derivatives;
compare the vector with a pre-determined hyperplane with N−1 dimensions; and
determine based on the comparison whether the transition is:
an event corresponding to any of one or more pre-determined imminent uses of the computing device by the user; or
a non-event not corresponding to any of the pre-determined imminent uses of the computing device by the user.

10. The media of claim 9, wherein the software is further configured to receive data defining the pre-determined hyperplane from a computing device of a social-networking system.

11. The media of claim 9, wherein the software is further configured to:
send the real-time sensor data to a computing device of a social-networking system; and
receive updated data re-defining the pre-determined hyperplane based at least in part on the real-time sensor data from the computing device of the social-networking system.

12. The media of claim 9, wherein the linear function comprises a filtering function, derivative function, convolution of a Heaviside or sigmoid function, or any combination thereof.

13. The media of claim 9, wherein:
the computing device is a mobile computing device;
the imminent intended use corresponds to physical contact between the user and the mobile computing device; and
the pre-determined function comprises powering on the mobile computing device.

14. The media of claim 9, wherein one or more of the sensors comprises a touch sensor, gyroscope, accelerometer, optical proximity sensor, ambient light sensor, or any combination thereof.

15. The media of claim 9, wherein the software is further configured to:
calculate a dot product of the vector and the pre-determined hyperplane; and
determine a position of the vector relative to the pre-determined hyperplane based at least in part on the calculation of the dot product.

16. The media of claim 15, wherein the software is further configured to determine the position of the vector is on same side of the pre-determined hyperplane as training data associated with the pre-determined imminent use.

17. The device of claim 9, wherein the software is further configured to:
calculate a dot product of the vector and the pre-determined hyperplane; and
determine a position of the vector relative to the pre-determined hyperplane based at least in part on the calculation of the dot product.

18. The device of claim 17, wherein the software is further configured to determine the position of the vector is on same side of the pre-determined hyperplane as training data associated with the pre-determined imminent use.

19. A device comprising:
a processor; and
one or more computer-readable non-transitory storage media coupled to the processor and embodying software that is configured when executed to:
receive real-time sensor data from N sensors on the device, the real-time sensor data corresponding to a transition in a physical state of the device caused by a user of the device;
apply a linear function to the real-time sensor data from each of the N sensors;
determine a vector based on an N-tuple comprising the derivatives;
compare the vector with a pre-determined hyperplane with N−1 dimensions; and
determine based on the comparison whether the transition is:
an event corresponding to any of one or more pre-determined imminent uses of the device by the user; or
a non-event not corresponding to any of the pre-determined imminent uses of the device by the user.

20. The device of claim 19, wherein the software is further configured to receive data defining the pre-determined hyperplane from a computing device of a social-networking system.

21. The device of claim 19, wherein the software is further configured to:
send the real-time sensor data to a computing device of a social-networking system; and
receive updated data re-defining the pre-determined hyperplane based at least in part on the real-time sensor data from the computing device of the social-networking system.

22. The device of claim 19, wherein the linear function comprises a filtering function, derivative function, convolution of a Heaviside or sigmoid function, or any combination thereof.

23. The device of claim 19, wherein:
the device is a mobile computing device;
the imminent intended use corresponds to physical contact between the user and the device; and
the pre-determined function comprises powering on the device.

24. The device of claim 19, wherein one or more of the sensors comprises a touch sensor, gyroscope, accelerometer, optical proximity sensor, ambient light sensor, or any combination thereof.

* * * * *